(12) United States Patent
Fermann et al.

(10) Patent No.: US 7,088,756 B2
(45) Date of Patent: Aug. 8, 2006

(54) POLARIZATION MAINTAINING DISPERSION CONTROLLED FIBER LASER SOURCE OF ULTRASHORT PULSES

(75) Inventors: Martin E. Fermann, Dexter, MI (US); Gyu C. Cho, Ann Arbor, MI (US)

(73) Assignee: Imra America, Inc., Ann Arbor, MI (US)

( * ) Notice: Subject to any disclaimer, the term of this patent is extended or adjusted under 35 U.S.C. 154(b) by 0 days.

(21) Appl. No.: 10/627,069

(22) Filed: Jul. 25, 2003

(65) Prior Publication Data

US 2005/0018714 A1  Jan. 27, 2005

(51) Int. Cl.
*H01S 5/00* (2006.01)

(52) U.S. Cl. .............. 372/45.013; 372/18; 372/75; 372/98

(58) Field of Classification Search .......... 372/6, 372/18, 75, 98, 102, 45.013, 95
See application file for complete search history.

(56) References Cited

U.S. PATENT DOCUMENTS

| | | | |
|---|---|---|---|
| 3,409,843 A | 11/1968 | Bowness | |
| 3,500,234 A * | 3/1970 | Goedertier | 372/11 |
| 3,584,312 A | 6/1971 | Statz | |
| 3,729,690 A | 4/1973 | Snitzer | |
| 3,801,931 A | 4/1974 | Heflinger et al. | |
| 3,928,818 A | 12/1975 | White | |
| 3,973,828 A | 8/1976 | Onoda et al. | |
| 3,978,429 A | 8/1976 | Ippen et al. | 372/18 |
| 4,787,927 A | 11/1988 | Mears et al. | |
| 4,864,577 A | 9/1989 | Aoshima et al. | |
| 4,991,923 A | 2/1991 | Kino et al. | |
| 5,005,175 A | 4/1991 | Desurvire et al. | |
| 5,008,887 A | 4/1991 | Kafka et al. | 372/6 |
| 5,050,183 A | 9/1991 | Duling, III | 372/6 |
| 5,067,134 A | 11/1991 | Oomen | |
| 5,136,598 A | 8/1992 | Weller et al. | |
| 5,163,059 A | 11/1992 | Negus et al. | 272/18 |
| 5,189,676 A | 2/1993 | Wysocki et al. | |
| 5,222,089 A | 6/1993 | Huber | |
| 5,226,049 A | 7/1993 | Grubb | |
| 5,272,560 A | 12/1993 | Baney et al. | |

(Continued)

FOREIGN PATENT DOCUMENTS

EP  0352974  1/1990

(Continued)

OTHER PUBLICATIONS

G.J. Valentine, et al. "Femtosecond Yb:YCOB laser pumped by narrow-stripe laser diode and passively modelocked using ion implanted saturable-absorber mirror" Electronic Letters, Sep. 14, 2000, vol. 36, No. 19, pp. 1621-1623.*

(Continued)

*Primary Examiner*—Minsun Oh Harvey
*Assistant Examiner*—Delma R. Flores Ruiz
(74) *Attorney, Agent, or Firm*—Knobbe, Martens, Olson & Bear, LLP

(57) ABSTRACT

A modelocked linear fiber laser cavity with enhanced pulse-width control includes concatenated sections of both polarization-maintaining and non-polarization-maintaining fibers. Apodized fiber Bragg gratings and integrated fiber polarizers are included in the cavity to assist in linearly polarizing the output of the cavity. Very short pulses with a large optical bandwidth are obtained by matching the dispersion value of the fiber Bragg grating to the inverse of the dispersion of the intra-cavity fiber.

62 Claims, 14 Drawing Sheets

U.S. PATENT DOCUMENTS

| | | | |
|---|---|---|---|
| 5,303,314 A | 4/1994 | Duling, III et al. ............. 372/6 |
| 5,311,603 A | 5/1994 | Fidric |
| 5,361,161 A | 11/1994 | Baney et al. |
| 5,363,386 A | 11/1994 | Smith |
| 5,400,350 A | 3/1995 | Galvanauskas |
| 5,414,725 A | 5/1995 | Fermann et al. |
| 5,422,897 A | 6/1995 | Wyatt et al. |
| 5,436,925 A | 7/1995 | Lin et al. |
| 5,448,579 A | 9/1995 | Chang et al. ................. 372/18 |
| 5,450,427 A | 9/1995 | Ferman et al. ................. 372/6 |
| 5,479,422 A | 12/1995 | Fermann et al. |
| 5,499,134 A | 3/1996 | Galvanauskas et al. |
| 5,513,194 A | 4/1996 | Tamura et al. |
| 5,574,738 A * | 11/1996 | Morgan ....................... 372/28 |
| 5,585,913 A | 12/1996 | Hariharan et al. |
| 5,617,434 A | 4/1997 | Tamura et al. |
| 5,627,848 A | 5/1997 | Fermann et al. ............ 372/102 |
| 5,633,885 A | 5/1997 | Galvanauskas et al. |
| 5,659,558 A | 8/1997 | Tohmon et al. |
| 5,663,731 A | 9/1997 | Theodoras, II et al. |
| 5,677,769 A | 10/1997 | Bendett |
| 5,689,519 A | 11/1997 | Fermann et al. |
| 5,696,782 A | 12/1997 | Harter et al. |
| 5,701,319 A | 12/1997 | Fermann |
| 5,818,630 A | 10/1998 | Fermann et al. |
| 5,844,927 A | 12/1998 | Kringlebotn |
| 5,847,863 A | 12/1998 | Galvanauskas et al. |
| 5,861,970 A | 1/1999 | Tatham et al. ............... 359/161 |
| 5,862,287 A | 1/1999 | Higashi ....................... 29/832 |
| 5,867,304 A | 2/1999 | Galvanauskas et al. |
| 5,880,877 A | 3/1999 | Fermann et al. |
| 5,920,668 A | 7/1999 | Uehara et al. |
| 5,923,686 A | 7/1999 | Fermann et al. |
| 5,959,735 A * | 9/1999 | Maris et al. ................. 356/632 |
| 6,014,249 A | 1/2000 | Fermann et al. |
| 6,020,591 A | 2/2000 | Harter et al. |
| 6,034,975 A | 3/2000 | Harter et al. ................. 372/18 |
| 6,072,811 A | 6/2000 | Fermann et al. |
| 6,097,741 A | 8/2000 | Lin et al. |
| 6,154,310 A | 11/2000 | Galvanauskas et al. |
| 6,181,463 B1 | 1/2001 | Galvanauskas et al. |
| 6,188,705 B1 | 2/2001 | Krainak et al. |
| 6,198,568 B1 | 3/2001 | Galvanauskas et al. |
| 6,208,458 B1 | 3/2001 | Galvanauskas et al. |
| 6,249,630 B1 | 6/2001 | Stock et al. ................. 359/161 |
| 6,252,892 B1 | 6/2001 | Jiang et al. |
| 6,275,512 B1 | 8/2001 | Fermann |
| 6,320,885 B1 | 11/2001 | Kawai et al. |
| 6,334,011 B1 | 12/2001 | Galvanauskas et al. |
| 6,373,867 B1 | 4/2002 | Lin et al. ....................... 327/18 |
| 6,393,035 B1 | 5/2002 | Weingarten et al. |
| 6,549,547 B1 | 4/2003 | Galvanauskas et al. |
| 6,570,892 B1 | 5/2003 | Lin et al. |
| 2001/0034089 A1* | 10/2001 | Yamazaki et al. .......... 438/166 |
| 2002/0072142 A1* | 6/2002 | Ooi et al. ..................... 438/46 |
| 2002/0105711 A1* | 8/2002 | Kaneko ....................... 359/248 |
| 2002/0146047 A1* | 10/2002 | Bendett et al. ............... 372/40 |
| 2003/0147434 A1* | 8/2003 | Hong et al. ................... 372/25 |
| 2003/0169797 A1* | 9/2003 | Aldaz et al. ................... 372/96 |
| 2004/0213302 A1* | 10/2004 | Fermann et al. ............... 372/6 |
| 2005/0146779 A1* | 7/2005 | Okhotnikov et al. ....... 359/321 |
| 2005/0238070 A1* | 10/2005 | Imeshev et al. .............. 372/21 |

FOREIGN PATENT DOCUMENTS

| | | |
|---|---|---|
| EP | 0564098 | 10/1993 |
| JP | 56-165385 | 12/1981 |

OTHER PUBLICATIONS

M.J. Ledered et al. Diode-pumped Femtosecond Yb:YAI2(BO3)4 Laser passively Mode-locked by an Ion-implanted SESAM, CLEO 2002/Wednesday Afternoon pp. 334-335.*

Snitzer, "Proposed Fiber Cavities for Optical Masers," *Journal of Applied Physics*, vol. 32, No. 1, Jan. 1961, pp. 36-39.

Koester, et al., "Amplification in a Fiber Laser," *Applied Optics*, vol. 3, No. 10, Oct. 1964, pp. 1182-1186.

Manni, "Two-Photon Excitation Expands the Capabilities of Laser-Scanning Microscopy," *Biophotonics International*, Jan./Feb. 1996, pp. 44-48, 50 and 52.

Krasinski, et al., "Multipass Amplifiers Using Optical Circulators," IEEE Journal of Quantum Electronics, vol. 26, No. 5, May 1990, pp. 950-958.

Tamura, et al., "Unidirectional ring resonators for self-starting passively mode-locked lasers," Optics Letters, vol. 18, No. 3, Feb. 1, 1993, pp. 220-222.

Ober, et al., "42-fs pulse generation from a mode-locked fiber laser started with a moving mirror," Optics Letters, vol. 18, No. 5, Mar. 1, 1993, pp. 367-369.

Hofer, et al., "Mode locking with cross-phase and self-phase modulation," Optics Letters, vol. 16, No. 7, Apr. 1, 1991, pp. 502-504.

Hofer, et al., "Characterization of Ultrashort Pulse Formation in Passively Mode-Locked Fiber Lasers," IEEE Journal of Quantum Electronics, vol. 28, No. 3, Mar. 1992, pp. 720-728.

Ippen, et al., "Additive pulse mode locking," Optical Society of America, vol. 6, No. 9, Sep. 1989, pp. 1736-1745.

Taverner, et al., "Polarisation Maintaining Figure-8 Laser," believed to have been presented at the Optical Society America Topical Meeting on Nonlinear Guided Wave Phenomena, Cambridge, England, Sep. 20-22, 1993, paper WC3, pp. 367-370 and pp. 1-4.

Duling, III, et al., "A Single-Polarization Er-Doped Fiber Amplifier," believed to have been presented at a conference on Lasers and Electro-Optics, vol. 12 of 992 OSA Tech. Digest Series, paper CPDP 28. (1992), pp. 694-695.

Krausz, et al., "Passive mode locking in standing-wave laser resonators," Optics Letters, vol. 18, No. 11, Jun. 1, 1993, pp. 888-890.

Tamura, et al., "77-fs pulse generation from a stretched-pulse mode-locked all fiber ring laser," Optics Letters, vol. 18, No. 13, Jul. 1, 1993, pp. 1080-1082.

Kelly, "Characteristic sideband instability of the periodically amplified average soliton," Electronic Letters, vol. 28, No. 8, Apr. 9, 1992, 1992, pp. 806-807.

Menyuk, "Stability of solitons in birefringent optical fibers. II. Arbitrary amplitudes," Optical Society of America, vol. 5, No. 2, Feb. 1988, pp. 392-402.

Fermann, et al., "Additive-pulse-compression mode locking of a neodymium fiber laser," Optical Letters, vol. 16, No. 4, Feb. 15, 1991, pp. 244-246.

Fermann, et al., "Passive mode locking in erbium fiber lasers with negative group delay," Appl. Phys. Letter, vol. 62, Mar. 1, 1993, pp. 910-912.

Duling, III, "All-fiber ring soliton laser mode locked with a nonlinear mirror," Optics Letters, vol. 16, No. 8, Apr. 15, 1991, pp. 539-541.

Walling, et al., "Tunable Alexandrite Lasers: Development and Performance," IEEE Journal of Quantum Electronics, vol. QE-21, No. 10, Oct. 1985, pp. 1568-1581.

Harter, et al., "Low-magnification unstable resonators used with ruby and alexandrite lasers," Optics Letters, vol. 11, No. 11, Nov. 1986, pp. 706-708.

Harter, et al., "Short pulse amplification in tunable solid state materials," SPIE, vol. 1229, 1990, pp. 19-28.

Poole, et al., "Fabrication of Low-Loss Optical Fibres Containing Rare-Earth Ions," *Electronics Letters*, vol. 21, No. 17, Aug. 15, 1985, pp. 737-738.

Fermann, et al., "Passive mode locking by using nonlinear polarization evolution in a polarization-maintaining erbium-doped fiber," OPTICS Letters, vol. 18, No. 11, Jun. 1, 1993, pp. 894-896.

Morioka, et al., "Ultrafast Reflective Optical Kerr Demultiplexer Using Polarisation Rotation Mirror," *Electronics Letters*, vol. 28, No. 6, Mar. 12, 1992, pp. 521-522.

Duling, III, et al., "Single-Polarisation Fibre Amplifier," Electronics Letters, vol. 28, No. 12, Jun. 4, 1992, pp. 1126-1128.

Matsas, et al., "Self-Starting Passively Mode-Locked Fabry-Perot Fiber Soliton Laser Using Nonlinear Polarization Evolution," IEEE Photonics Technology Letters, vol. 5, No. 5, May 5, 1993, pp. 492-494.

Ober, et al., "Self-starting diode-pumped femtosecond Nd fiber laser", *Optics Letters*, vol. 18, No. 18, Sep. 15, 1993, pp. 1532-1534.

Fermann, et al., "Environmentally stable Kerr-type mode-locked erbium fiber laser producing 360-fs pulses," *Optics Letters*, vol. 19, No. 1, Jan. 1, 1994, pp. 43-45.

Fermann, "Ultrashort-Pulse Sources Based on Single-Mode Rare-Earth-Doped Fibers," *Applied Physics B*, vol. 58, 1994, pp. 197-209.

Desurvire, et al., "High-gain erbium-doped traveling-wave fiber amplifier," *Optics Letters*, vol. 12, No. 11, Nov. 1987, pp. 888-890.

Loh, et al., "All-solid-state subpicosecond passively mode locked erbium-doped fiber laser," *Applied Physics Letters*, vol. 63, No. 1, Jul. 5, 1993, pp. 4-6.

Barnett, et al., "High-power erbium-doped fiber laser mode locked by a semiconductor saturable absorber," *Optics Letters*, vol. 20, No. 5, Mar. 1995, pp. 471-473.

Loh, et al. "Diode-Pumped Selfstarting Passively Modelocked Neodymium-Doped Fibre Laser," *Electronics Letters*, vol. 29, No. 9, Apr. 29, 1993, pp. 808-810.

Duling, III, "Compact sources of ultrashort pulses," date unknown, pp. 179-207. Copy not available.

Reddy, et al., "A Turnkey 1.5 :m Picosecond Er/Yb Fiber Laser," *Conference On Optical Fiber Communication*, OFC, paper PD17, 1993. Copy not available.

PCT Search Report and Written Opinion of International Searching Authority, Mar. 14, 2005.

\* cited by examiner

POLARIZATION MAINTAINING DISPERSION CONTROLLED FIBER LASER SOURCE OF ULTRASHORT PULSES

FIELD OF THE INVENTION

This invention relates to modelocked fiber lasers and more particularly an ultra-compact integrated fiber laser with pulse width control in conjunction with concatenated sections of polarization maintaining and non-polarization maintaining fiber sections.

BACKGROUND OF THE INVENTION

Modelocked fiber lasers are increasingly displacing traditional solid-state lasers in ultrafast optic applications. Modelocked fiber lasers can be packaged in very small spaces and also exhibit superior mechanical and thermal stability. In particular, passively modelocked fiber lasers allow compact designs because of the absence of bulky optical modulators. Fiber laser systems are pumped using diode lasers with an emission wavelength shorter than the fiber laser emission wavelength. For upconversion-type fiber lasers, the pump wavelength can be longer than the emission wavelength. Generally, similar to the majority of all laser systems, the pump wavelength differs from the emission wavelength; a fact which is well known in the art.

Passively modelocked fiber lasers often comprise saturable absorbers to initiate and stabilize the pulse formation process. Examples of laser systems using saturable absorbers in this manner are described in U.S. Pat. No. 5,689,519 ('519) to Fermann et al., which patent is hereby incorporated herein by reference, and U.S. Pat. No. 5,448,579 ('579) to Chang et al.

Semiconductor saturable absorbers have been implemented in modelocked lasers for a long time. Of particular interest are multiple-layer heterostructures as suggested in U.S. Pat. No. 4,860,296 ('296) to D. S. Chemla et al. However, these early saturable absorber designs were restricted in that they contained nonlinear layers with a spacing of exactly an integer multiple of a predetermined optical period. Moreover, the incorporation of multiple layer heterostructures as suggested by '296 relied on semiconductor layers with a thickness of less than 500 Å in order to exploit quantum-confinement effects. Such thin semiconductor layers generally restrict the bandwidth over which pulse shaping is possible with saturable absorbers.

A more workable saturable absorber solution was suggested in U.S. Pat. No. 6,252,892 ('892) to Jiang et al., where a resonant saturable absorber for passive modelocking of lasers was described. Moreover, '892 suggests distributed resonant saturable absorbers comprising layers of saturable absorber material separated by semiconductor layers not restricted to a thickness of less than 500 Å. Semiconductor layers with a thickness greater than 500 Å are indeed useful for maximizing the pulse shaping action of saturable absorbers.

As is well known in the art of passive modelocking of color center lasers (Islam et al., IEEE J. Quantum Electron. Vol. 25, pp. 4254 (1989)), the optically excited carriers in semiconductor saturable absorbers generally relax with different time constants. A first time constant of approximately 300 fs depends on the charge carrier density and excess energy of the hot photo-excited carriers due to intraband dynamics, e.g. thermalization and cooling of hot carriers to the band edge. A second longer time constant of 1 ps–30 ns is due to interband dynamics, e.g. the recombination of the carriers.

These different time constants can be easily realized if the hot charge carriers are excited well above (about an optical phonon energy above) the band edge. However, when the carriers are photo-excited at the band edge, the intraband contribution becomes weak due to the low carrier temperature. The excitation near-band edge is usually preferred in saturable absorber design because of the resulting resonant enhancement of the optical nonlinearity. In this case, the nonlinear optical response is governed by the interband dynamics including trap center assisted recombination and carrier relaxation with two different time constants cannot necessarily be observed and moreover, the ratio of carrier centers relaxing at the two different time constants cannot be controlled.

The interband dynamics are generally manipulated by introducing trap centers for photo-excited charge carriers either by arsenic anti-sites in GaAs-related material systems grown at low temperature or by implantation with ions. It has been readily reported (A. R. Hopfel, Ch. Teissl, and K. F. Lambrecht, Appl. Phys. Lett. 53, p. 12581 (1996)) that the trapping rate dominate the intraband dynamics in InP implanted with 200 keV protons ($H^+$) at a dose of $1 \times 10^{16}$ $cm^{-2}$, when excited with 1.7 eV photons. The carrier trap time can be sub 100 fs and the cw luminescence shows a non-Fermi distribution, indicating the hot carriers undergo a recombination process before they cool down to the band edge.

For ultrafast fiber lasers modelocked by saturable absorbers as described in U.S. Pat. No. 6,252,892 it was shown that cw modelocking is initiated by Q-switched mode-locking in the very early stages of pulse formation. Hence, Q-switch pulses in the cavity are used for the start of modelocking and the support of Q-switch pulses by a slow optical modulation process in the absorber is useful.

Hence, the first longer time constant can be used to initiate pulse formation, whereas the second shorter time constant can be used to stabilize the oscillation of short femtosecond pulses. However, to date no control of the ratio of carriers relaxing at these time constants was possible.

In fiber lasers, soliton shaping and or nonlinear polarization evolution can further be used to stabilize pulse formation as described in '519. However, to compete on an equal level with modelocked solid state lasers in ultrafast optics applications, modelocked fiber lasers should include the following: 1) the output polarization state should preferably be well defined, 2) the construction of the fiber laser should preferably be adaptable to mass production, 3) the required optical elements should preferably be as inexpensive as possible, and 4) the design concept should preferably comprise saturable absorbers with well controllable parameters. It is with respect to these four factors that current, conventional, modelocked fiber laser technology still needs improvement.

Early modelocked fiber laser designs, as exemplified in '519, relied on non-fiber components for stable operation. Although these early modelocked fiber lasers could further accommodate devices that enabled wavelength tuning, a fiber pig-tailed output signal with a well-defined polarization state was not easily attainable. Similarly, '579 also included bulk optical components.

Improvements in the basic design of modelocked fiber lasers were made possible by the use of fiber Bragg gratings to control the dispersion inside the cavity or as replacements for cavity-end mirrors in Fabry-Perot-type cavity designs (U.S. Pat. No. 5,450,427 ('427) to Fermann et al., which patent is hereby incorporated herein by reference). Moreover, the incorporation of polarization maintaining fiber was further suggested in '427 to limit the sensitivity of the cavity to mechanical perturbations of the fiber. These designs allowed compact wavelength-tunable set-ups as well as synchronization to external electronic clocks. Wavelength tunable passively modelocked fiber lasers were later also described in U.S. Pat. No. 6,097,741 ('741) and U.S. Pat. No. 6,373,867 ('867) to Lin et al.

Further improvements became possible by constructing cladding-pumped modelocked fiber lasers (U.S. Pat. No. 5,627,848 ('848) to Fermann et al., which patent is hereby incorporated herein by reference).

The need for bulk polarizers was eliminated by the implementation of all-fiber polarizers as disclosed in U.S. Pat. No. 6,072,811 ('811) to Fermann et al., which patent is hereby incorporated herein by reference. Such integrated modelocked fiber lasers could also incorporate fiber Bragg gratings for output coupling. The use of fiber Bragg gratings and all-fiber polarizers in the absence of any non-fiber polarization manipulating elements constituted a great simplification compared to single-polarization fiber lasers as discussed by DeSouza et al. (Electron. Lett., vol. 19, p. 679, 1993).

Limitations in integrated cavity designs arose from the need for fiber Bragg gratings written in polarization maintaining fiber to produce a linear polarization state of the output pulses. A high degree of laser integration has also been accomplished in the subsequent '741 and '867 patents. These designs lack high polarization extinction, all-fiber elements for polarization selection, and they rely on several concatenated intra-cavity polarization-maintaining fiber elements of extended length, which can induce the generation of satellite pulses at the fiber output. Indeed, as described in U.S. patent application Ser. No. 09/809,248, in the presence of concatenated fiber sections, pulse stability requires the single-pass group delay between the polarization axes of each fiber section to be larger than the generated pulse width. This is required to prevent any coherent interaction of intra-cavity pulses propagating along the two polarization axes at any coupling point, e.g., fiber splices. Such coherent interactions can generally produce temperature and fiber stress dependent instabilities, which are preferably avoided. Similarly, no all-fiber elements for controlling the spot size on an intra-cavity saturable absorber were described in '741 and '867.

Another method for producing an integrated cavity was introduced by Sharp et al. (U.S. Pat. No. 5,666,373 ('373)) where the use of a saturable absorber as an output coupler is described. A limitation with such designs is the required precision-polishing and AR-coating at the back-end of the saturable absorber to avoid the formation of satellite pulses inside the cavity.

The construction of high-power modelocked fiber lasers, as enabled by the use of multi-mode fibers inside a fiber laser cavity, is taught in U.S. Pat. No. 6,275,512 ('512) to Fermann et al., which patent is hereby incorporated herein by reference.

A passively modelocked fiber laser particularly suitable for producing pulses with a bandwidth approaching the bandwidth of the gain medium was suggested in U.S. Pat. No. 5,617,434 ('434) to Tamura et al. where fiber segments with opposing dispersion values were implemented. This design has limited functionality due to the presence of at least two long lengths of fiber with different dispersion coefficients for dispersion compensation, as well as the presence of non-polarization maintaining fiber, greatly complicating polarization control inside the cavity.

The design principles used in the patents mentioned above were reiterated in a series of recent patents and applications to Lin et al. (U.S. Pat. No. 6,097,741; U.S. Pat. No. 6,373,867, and application Ser. No. US2002/0071454). The designs described in Pat. Nos. '741 and '867 lack appropriate all-fiber, high polarization extinction, polarizing elements that are generally required to minimize the formation of satellite pulses at the fiber output. Moreover, these patents do not describe all-fiber means to control the spot size on the intra-cavity saturable absorber; control of the spot size is required to optimize the life-time of the saturable absorber. Equally none of the prior art describes ion-implanted saturable absorber designs with controlled ion depth penetration.

SUMMARY OF THE INVENTION

The present invention is directed to a mass-producible passively modelocked fiber laser. By incorporating apodized fiber Bragg gratings, integrated fiber polarizers and concatenated sections of polarization-maintaining and non-polarization-maintaining fibers, a fiber pig-tailed, linearly polarized output can be readily obtained from the laser. By further matching the dispersion value of the fiber Bragg grating to the inverse, or negative, of the dispersion of the intra-cavity fiber, the generation of optimally short pulses with a large optical bandwidth can be induced. In this regard, either positive dispersion fiber in conjunction with negative dispersion fiber gratings or negative dispersion fiber in conjunction with positive dispersion fiber gratings can be implemented. Preferably, the dispersion characteristics of the fiber Bragg grating and the dispersion characteristics of the rest of the intra-cavity elements are matched to within a factor of three. Even more preferably, these characteristics are matched within a factor of two, or within a factor in the range of 1.0 to 2.0. Also preferably, the Bragg grating has a chirp rate greater than 80 nm/cm. More preferably, the Bragg grating has a chirp rate greater than 160 nm/cm. Most preferably, the Bragg grating has a chirp rater greater than 300 nm/cm. To maximize the output power and the pulse repetition rate, the use of wide-bandwidth fiber Bragg gratings with low absolute dispersion is preferable. These fiber Bragg gratings are also used as end-mirrors for the cavity and allow the transmission of pump light to the intra-cavity gain fiber. The fiber Bragg gratings are conveniently produced using phase masks.

Alternatively, fiber couplers can be used inside the fiber cavity. Generally, sections of polarization-maintaining and non-polarization-maintaining fiber can be concatenated inside the fiber cavity. The non-polarization-maintaining section should then be short enough so as not to excessively perturb the polarization state. Intra-cavity sections of non-polarization-maintaining fiber preferably comprise all-fiber polarizers to lead to preferential oscillation of one linear polarization state inside the cavity. Similarly, when directly concatenating polarization-maintaining fiber sections, the length of the individual section should be long enough to prevent coherent interactions of pulses propagating along the two polarization axes of the polarization-maintaining fibers, thereby ensuring a maximum in pulse stability.

Saturable absorber mirrors (SAMs) placed inside the cavity enable passive modelocking. The saturable absorbers (SA) can be made from multiple quantum wells (MQW) or bulk semiconductor films. These saturable absorbers have preferably a bi-temporal life-time with a slow component (>>100 ps) and a fast component (<<20 ps). The realization of the bi-temporal dynamics of the optical nonlinearity is achieved by tailoring the depth profile of the ion-implantation in combination with the implantation dose and energy. The result is that the carriers trap at distinctively different rates in different depth regions of the SAM.

Saturating semiconductor films can for example be grown from aluminum-containing material such as AlGaInAs, the exact composition can be selected depending on the sought band-gap (typically selected to be in the vicinity of the desired operating wavelength of the laser system) and it is also governed by the requirement of lattice-match between the saturating semiconductor film and an underlying Bragg mirror or any other adjacent semiconductor material. Compositional requirements enabling lattice match between semiconductors and/or a certain bandgap are well known in the state of the art and are not further explained here.

In aluminum containing semiconductors the surface area can induce a low optical damage threshold triggered by oxidization of the surface. In order to prevent optical damage of aluminum containing surface areas a passivation layer, e.g., InP, InGaAs or GaAs, is incorporated. SA degradation is further minimized by optimizing the optical beam diameter that impinges on the SAM. In one implementation the SAM and an intra-cavity fiber end can be either butt-coupled or brought into close contact to induce modelocking. Here, the incorporation of a precision AR-coating on the intra-cavity fiber end minimizes any bandwidth restrictions from etalon formation between the SAM and the fiber end. Etalons can also be minimized by appropriate wedging of the fiber ends. The beam diameter inside the SAM can be adjusted by implementing fiber ends with thermally expanded cores. Alternatively, focusing lenses can be directly fused to the fiber end. Moreover, graded-index lenses can be used for optimization of the focal size and working distance between the fiber tip and SA surface.

Wavelength tuning of the fiber lasers can be obtained by heating, compression or stretching of fiber Bragg gratings or by the incorporation of bulk optic tuning elements.

The use of bi-or multi-temporal saturable absorbers allows the design of dispersion compensated fiber laser operating in a single-polarization state, producing pulses at the bandwidth limit of the fiber gain medium. Additional spectral broadening can be obtained by launching these pulses into highly nonlinear fibers, allowing for the generation of broad-bandwidth pulses with bandwidths exceeding one octave for use in optical coherence tomography or in precision metrology.

DETAILED DESCRIPTION OF THE PREFERRED EMBODIMENT

Figure 1:
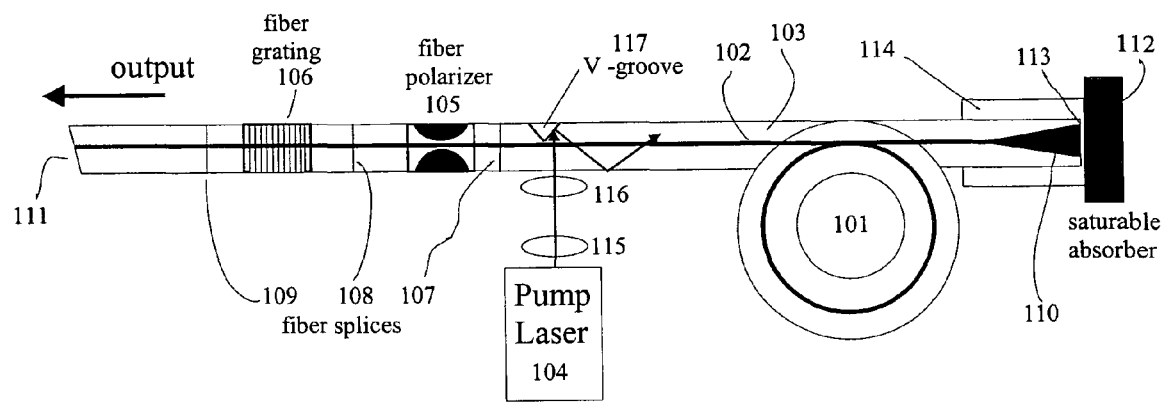
FIG. 1 is a diagram of a cladding pumped fiber cavity design according to a first embodiment of the invention.

FIG. 1 represents an exemplary embodiment of the present invention embodied in a fiber laser cavity 100. A polarization-maintaining gain fiber 101 has a core 102 and cladding region 103. The fiber core 102 is doped with rare-earth ions, such as Yb, Nd, Er, Er/Yb, Tm or Pr, to produce gain at a signal wavelength when the laser is pumped with diode laser 104. The fiber core can be single-mode or multi-mode. The fiber laser cavity 100 further contains an integrated fiber polarizer 105 and a chirped fiber Bragg grating 106. Both of these elements, 105 and 106, are generally constructed of short fiber pigtails (e.g., 0.001–1 m in length), which are preferably fusion-spliced to fiber 101 using splices 107, 108 and 109. Alternatively, fiber polarizer 105 can be spliced in front of beam expander 110. When using multi-mode fiber, splice 107 is selected to match the fundamental mode in the gain fiber 101.

An exemplary integrated fiber polarizer in accordance with the invention comprises a polarization-maintaining undoped polarizer fiber (PF), with two orthogonal polarization axes, where the loss along one polarization axis is significantly higher than the loss along the other polarization axis. Alternatively, a very short section (less than 1 cm) of non-birefringent fiber (i.e., non-polarization-maintaining fiber) can be sandwiched between two sections of polarization-maintaining fiber, where the polarization axes of the polarization-maintaining fibers are aligned with respect to each other. By side-polishing the non-birefringent fiber, e.g., down to the evanescent field of the fiber core, along one of the axes of the birefringent fiber, and coating the polished region with metal, high extinction polarization action can be obtained along one of the axes of the birefringent fiber. The design of side-polished fiber polarizers is well known in the field and not discussed further here.

For optimum laser operation, the fiber polarization axes of the PF are aligned parallel to the polarization axes of the gain fiber 101. To ensure stable modelocked operation, the polarizer preferably effectively eliminates satellite pulses generated by any misalignment between the polarization axes of the PF and the gain fiber 101.

Neglecting any depolarization in the all-fiber polarizer itself, it can be shown by applying a Jones matrix calculation method that for a misalignment of the polarization axes of gain fiber 101 and fiber polarizer 105 by $\alpha$ degrees, the linear reflectivity R from the right-hand side of the cavity varies approximately between $R=1-0.5 \sin^2 2\alpha$ and $R=1$ depending on the linear phase in the gain fiber 101. If the group delay along the two polarization axes of the gain fiber is larger than the intra-cavity pulse width, any satellite pulse is suppressed by $\sin^4\alpha$ after transmission through the polarizer. Typical fiber splicing machines can align polarization-maintaining fibers with an angular accuracy of less than $\pm 2°$; hence any reflectivity variation due to drifts in the linear phase between the two polarization eigenmodes of fiber 101 can be kept down to less than $3\times 10^{-3}$, whereas (for sufficiently long fibers) any satellite pulses obtained after transmission through the polarizer can be kept down to less than $6\times 10^{-6}$ when using an integrated polarizer.

The chirped fiber Bragg grating 106 is preferably spliced to the PF 105 at splice position 108 and written in non-polarization-maintaining fiber. In order to avoid depolarization in the fiber Bragg grating, the Bragg grating pig-tails are preferably kept very short, e.g., a length smaller than 2.5 cm is preferable between splice locations 108 and 109. To obtain a linear polarization output, a polarization-maintaining fiber pig-tail is spliced to the left-side of the fiber Bragg grating at splice location 109. The laser output is obtained at a first fiber (or cavity) end 111, which is preferably angle-cleaved to avoid back-reflections into the cavity.

Fiber Bragg grating 106 serves two functions. First, it is used as an output mirror (i.e., it feeds part of the signal back to the cavity) and, second, it controls the amount of cavity dispersion. In the present implementation, the chirped fiber Bragg grating has a negative (soliton-supporting) dispersion at the emission wavelength in the wavelength region near 1060 nm and it counter-balances the positive material dispersion of the intra-cavity fiber. To produce the shortest possible pulses (with an optical bandwidth comparable to or larger than the bandwidth of the gain medium), the absolute value of the grating dispersion is selected to be within the range of 0.5–10 times the absolute value of the intra-cavity fiber dispersion. Moreover, the fiber Bragg grating is apodized in order to minimize any ripple in the reflection spectrum of the grating. Accordingly, the oscillation of chirped pulses is enabled in the cavity, minimizing the nonlinearity of the cavity and maximizing the pulse energy. Chirped pulses are characterized in having a pulse width which is longer than the pulse width that corresponds to the bandwidth limit of the corresponding pulse spectrum. For example the pulse width can be 50%, 100%, 200% or more than 1000% longer than the bandwidth limit.

Alternatively, the oscillation of chirped pulses is also enabled by using negative dispersion fiber in conjunction with positive dispersion chirped fiber Bragg gratings. Pulses with optical bandwidth comparable to the bandwidth of the gain medium can also be obtained with this alternative design.

A SAM 112 at a second distal fiber end 113 completes the cavity. In an exemplary implementation a thermally expanded core (TEC) 110 is implemented at cavity end 113 to optimize the modelocking performance and to allow close coupling of the SAM 112 to the second fiber end 113 with large longitudinal alignment tolerances. Etalon formation between the fiber end 113 and the SAM 112 is prevented by an anti-reflection coating deposited on fiber end 113 (not separately shown). In the vicinity of the second fiber end 113, fiber 101 is further inserted into ferrule 114 and brought into close contact with SAM 112. Fiber 101 is subsequently fixed to ferrule 114 using, for example, epoxy and the ferrule itself is also glued to the SAM 112.

The pump laser 104 is coupled into the gain fiber 101 via a lens system comprising, for example, two lenses 115 and 116 and a V-groove 117 cut into fiber 101. Such side-coupling arrangements are described in, for example, U.S. Pat. No. 5,854,865 ('865) to L. Goldberg et al. Alternatively, fiber couplers can be used for pump light coupling.

Figure 2A:
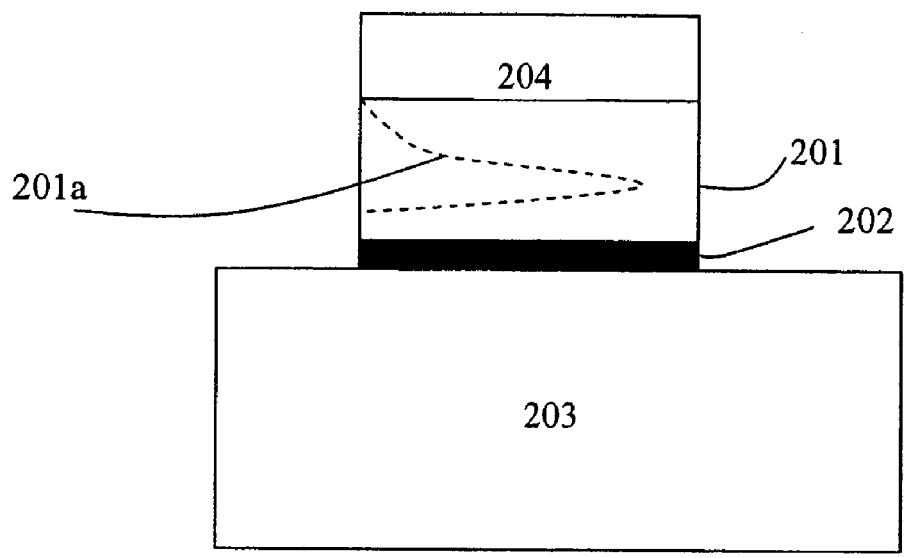
FIG. 2a is a diagram of a saturable absorber mirror according to an embodiment of the invention.

An exemplary design for a SAM in accordance with the present invention is shown in FIG. 2a. For example, SAM 200 includes an InGaAsP layer 201 with a thickness of 50–2000 nm. Further, layer 201 is grown with a bandedge in the 1 μm wavelength region; the exact wavelength is defined by the sought emission wavelength of the fiber laser and can vary between 1.0–1.6 μm. The InGaAsP layer 201 is further coated or processed with a reflective material such as Au or Ag. A dielectric mirror or semiconductor Bragg reflector 202 is located beneath layer 201 and the entire structure is attached to heat sink 203, based on, for example, metal, diamond or sapphire.

In order to cover a broad spectral range (e.g., greater than 100 nm) metallic mirrors are preferred. When using a metallic mirror it is advantageous to remove the substrate (InP) by means of etching. When using HCl as an etching solvent the etching selectivity between InGaAsP and InP can be low, depending on the compound composition of InGaAsP. An etch-stop layer is beneficial between the substrate and the InGaAsP layer. InGaAs can be a proper etch-stop layer. When adding an InGaAs layer with a band-gap wavelength shorter than 1.03 μm, lattice relaxations can be avoided by keeping the thickness below 10 nm.

The InGaAsP layer can further be anti-reflection coated with layer 204 on its upper surface to optimize the performance of the SAM. Because of the saturable absorption by InGaAsP, the reflectivity of the SAM increases as a function of light intensity, which in turn favors the growth of short pulses inside the laser cavity. The absence of Al in the saturable absorber layer prevents oxidization of the semiconductor surfaces in ambient air and thus maximizes the life-time and power handling capability of the structure.

Instead of InGaAsP, any other Al-free saturable semiconductor can also be used in the construction of the SAM. Alternatively, Al-containing semiconductors can be used in the SAM with appropriately passivated surface areas. Surface passivation can, for example, be accomplished by sulfidization of the semiconductor surface, encapsulating it with an appropriate dielectric or with an Al-free semiconductor cap layer. An AlGaInAs/InP absorber layer grown lattice-matched on InP can be surface-passivated with a thin (about 10 nm range) cap layer of InP. AlGaInAs with a higher bandgap energy than the absorber layer can also be used for a semiconductor Bragg reflector in combination with InP. Among concepts for semiconductor Bragg mirrors lattice-matched to InP, an AlGaInAs/InP combination has an advantage over an InGaAsP/InP Bragg reflector due to its high refractive index contrast.

Figure 2B:
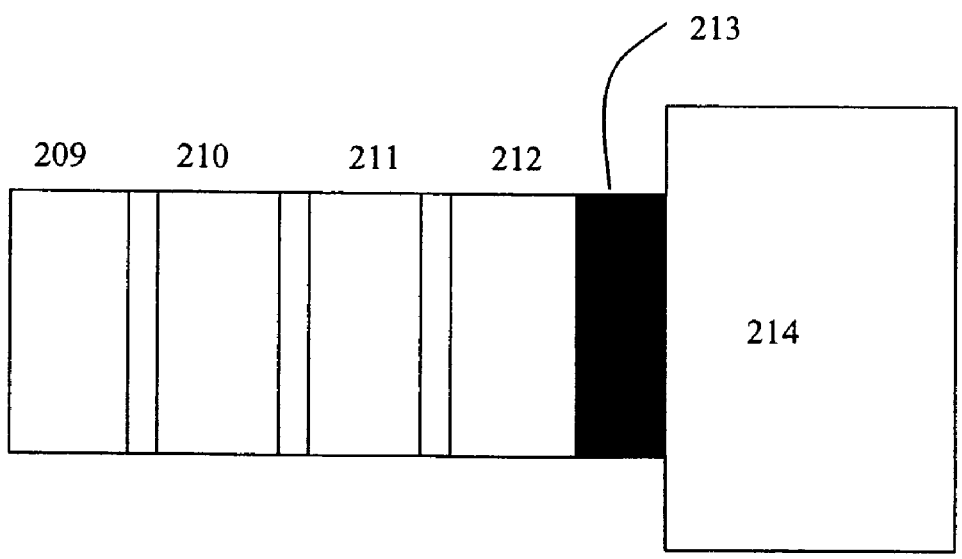
FIG. 2b is a diagram of a saturable absorber mirror according to an alternative embodiment of the invention.

Instead of a bulk semiconductor saturable absorber, a MQW saturable absorber structure as shown in FIG. 2*b* may also be used. In this case, the SAM 205 conveniently comprises MQW structures 206, 207 and 208 separated by passive spacer layers 209–212 in order to increase the saturation fluence and depth-selective ion-implantation concentration of each MQW section. Additional MQW structures can further be used, similarly separated by additional passive spacer layers. To reduce the wavelength and location sensitivity of the MQW saturable absorbers, the width of the spacer layers varies from spacer layer to spacer layer. Furthermore, multiple bulk layers with thicknesses larger than 500 Å can replace the MQW structure. The MQW layers, in turn, can contain several layers of quantum wells and barriers such as, for example, InGaAs and GaAs, respectively. Top surface 209 can further be anti-reflection coated (not shown); a reflective structure is obtained by including mirror structure 213. The entire structure can be mounted on heat sink 214.

The control of the response time of the saturable absorption for concomitant existence of fast and slow time constants is realized by introducing carrier trap centers with depth controlled H+ (or other ions) implantation. The implantation energy and dose are adjusted such that part of the absorbing semiconductor film contains a minimal number of trap centers. For example the semiconductor layer with the minimal number of trap centers can be selected to be at the edge of the optical penetration range of exciting laser radiation. Such a design serves only as an example and alternatively any semiconductor area within the optical penetration range can be selected to contain a minimal number of trap centers. Hence distinctive bi-temporal carrier relaxation is obtained in the presence of optical excitation. As an illustration of depth selective ion implantation, FIG. 3 shows the measurement of the depth profile of H+ ion implantation of an InGaAsP absorber film taken from secondary ion mass spectroscopy (SIMS).

Figure 3:
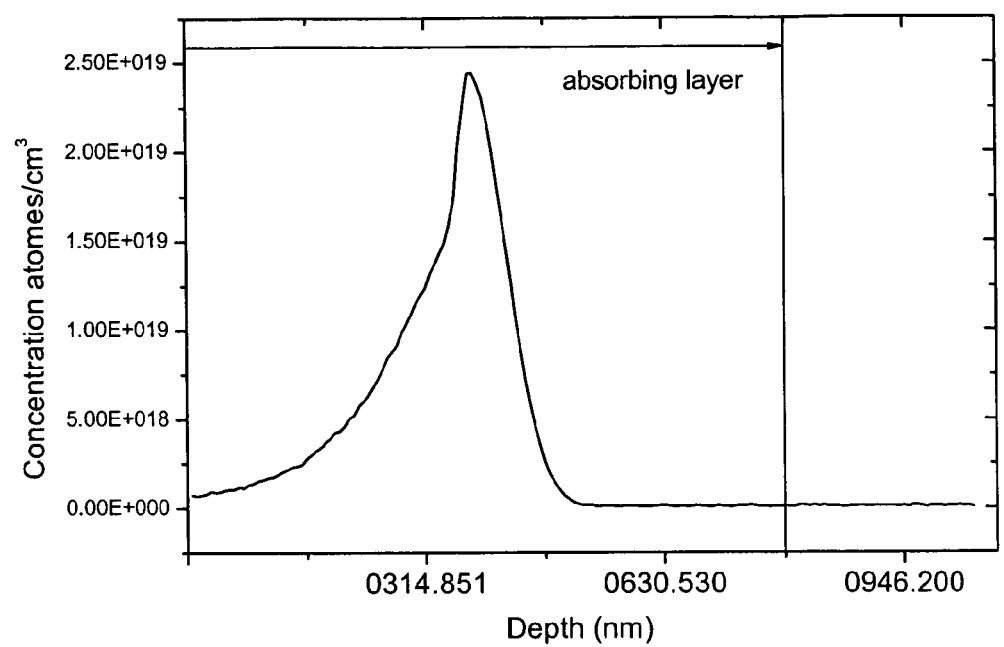
FIG. 3 is a diagram of the proton concentration as a function of depth obtained after proton implantation into a saturable semiconductor film.
Figure 4:
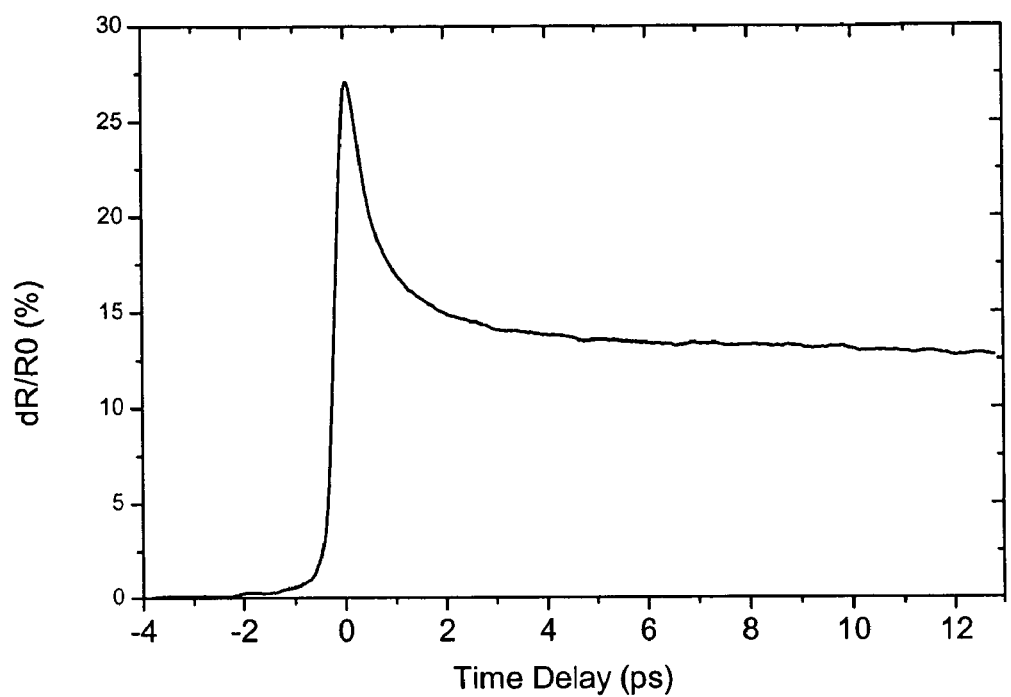
FIG. 4 is a diagram of the measured bi-temporal reflectivity modulation obtained in a semiconductor saturable mirror produced by ion-implantation with selective depth penetration.

The obtained bi-temporal carrier life-time obtained with the semiconductor film with a proton concentration as shown in FIG. 3, is further illustrated in FIG. 4. Here the reflectivity modulation (dR/R0) of a semiconductor saturable mirror due to excitation of the saturable mirror with a high energy short pulse at time t=0 is shown as a function of time delay. The measurement was obtained with a pump-probe technique, as well known in the art. FIG. 4 clearly displays the bi-temporal response time due to fast (<1 ps) and slow (>>100 ps) recovery. The distinctive fast response originates from the depth region with high trap concentration, while the slow component results from the rear depth region with a much lower trap center concentration.

When employing this absorber in the laser system described with respect to FIG. 1, Q-switched mode-locking is obtained at intracavity power levels of a few mW. At the operating pump power level, stable cw mode-locking evolving from Q-switch mode-locking is observed. In contrast, no Q-switching and no mode-locking operation is obtained with the same semiconductor material implanted uniformly with protons without bi-temporal carrier relaxation (exhibiting only fast carrier relaxation).

We emphasize that the description for FIG. 3 and FIG. 4 is to serve as an example in controlling 1) the fast time constant, 2) the slow time constant, 3) the ratio of the fast and slow time constants, 4) the amplitude of the fast response, 5) the amplitude of the slow response, and finally 6) the combination of all of the above by ion implantation in a saturable absorber. Thus, the concept depicted hereby can be applicable for any type of laser modelocked with a saturable absorber. Specifically, in the presence of unavoidable large spurious intra-cavity reflections such as in fiber lasers or thin disk lasers (F. Brunner et al., Sub-50 fs pulses with 24 W average power from a passively modelocked thin disk Yb:YAG laser with nonlinear fiber compression, Conf. on Advanced Solid State Photonics, ASSP, 2003, paper No.: TuA1), the disclosed engineerable bi-temporal saturable absorbers can greatly simplify and stabilize short pulse formation.

The preferred implantation parameters for H+ ions in GaAs or InP related materials including MQW absorbers are as follows: The doses and the implantation energies can be selected from $10^{12}$ cm$^{-2}$ to $10^{17}$ cm$^{-2}$ and from 5 keV to 200 keV, respectively, for an optically absorbing layer thickness between 50 nm and 2000 nm. For MQW absorbers, the selective ion-implantation depth is rather difficult to measure because the shallow MQW falls into the implantation peak in FIG. 3. However, with the separation of MQW sections with spacers 209–212 (as shown in FIG. 2) it is feasible to employ depth selective ion implantation. For arsenic implantation, the implantation parameters for 50–2000 nm absorbing layer spans from $10^{12}$ cm$^{-2}$ to $10^{17}$ cm$^{-2}$ for the dosage and an implantation energy range of 100 keV to 1000 keV. In case of MQW saturable absorbers, the implantation range is preferably selected within the total thickness of the semiconductor layer structure containing MQW sections and spacers. In addition to H+ and arsenic, any other ions such as for example Be can be implanted with controlled penetration depth by adjusting the above recipes according to the stability requirements of the desired laser. Depth selective ion implantation is illustrated in FIG. 2*a* in which dashed curve 201*a* represents the H+ ion depth profile of FIG. 3.

Figure 5A:
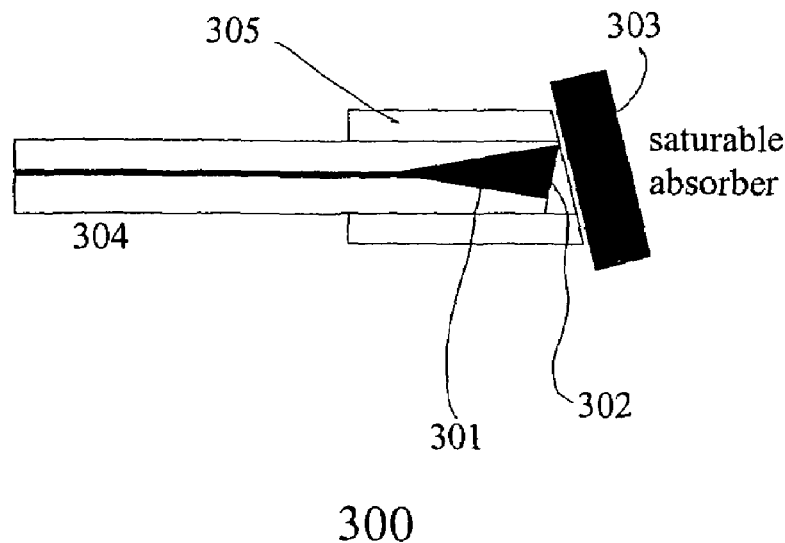
FIG. 5a is a diagram of a scheme for coupling a saturable absorber mirror to a fiber end according to an embodiment of the invention.

FIG. 5*a* illustrates an alternative implementation of the fiber end and SAM coupling in FIG. 1. Here cavity 300 comprises an angle-polished thermal-diffusion expanded core (TEC) 301. Fiber end 302 is brought into close contact with SAM 303 and fiber 304 is rotated inside ferrule 305 to maximize the back reflection from SAM 303. Ferrule 305 is further angle-polished and SAM 303 is attached to the angle-polished surface of ferrule 305. As shown in FIG. 5*a*, fiber 304 is conveniently glued to the left-hand side of ferrule 305. A wedge-shaped area between the fiber surface 302 and SAM 303 greatly reduces the finesse of the etalon between the two surfaces, which is required for optimum modelocked laser operation.

Figure 5B:
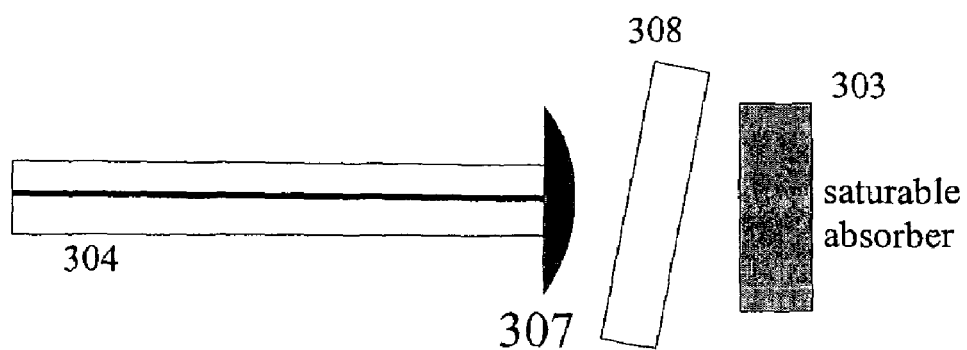
FIG. 5b is a diagram of a scheme for coupling a saturable absorber mirror to a fiber end according to an alternative embodiment of the invention.

Instead of TEC cores, more conventional lenses or graded index lenses can be incorporated between the fiber end and the SAM to optimize the beam diameter on the SAM. Generally, two lenses are required. A first lens collimates the beam emerging from the fiber end, and a second lens focuses the beam onto the SAM. According to present technology, even conventional lenses allow the construction of a very compact package for the second fiber end. An implementation with two separate collimation and focusing lenses is not separately shown. To minimize unwanted backreflections into the fiber cavity and to minimize the number of components, a single lens can be directly fused to the fiber end as depicted in FIG. 5*b*. As shown in FIG. 5*b*, assembly 306 contains SAM 303 and fiber 304 as well as lens 307, which focuses the optical beam onto the SAM. Lens 307 can also include a graded index lens.

To minimize aberrations in assembly 306, an additional lens can also be incorporated between lens 307 and SAM 303. Such an assembly is not separately shown. Alternatively, a lens can be directly polished onto fiber 304; however, such an arrangement has the disadvantage that it only allows a beam size on the SAM which is smaller than the beam size inside the optical fiber, thereby somewhat restricting the design parameters of the laser. To circumvent this problem, a lens surface can be directly polished onto the surface of a TEC; such an implementation is not separately shown. Another alternative is to exploit a graded-index lens design attached directly onto the fiber tip to vary the beam size on the SAM. In the presence of air-gaps inside the oscillator a bandpass filter 308 can be incorporated into the cavity, allowing for wavelength tuning by angular rotation as shown, for example, in FIG. 5b.

Passive modelocking of laser cavity 100 (FIG. 1) is obtained when the pump power exceeds a certain threshold power. In a specific, exemplary, implementation, polarization-maintaining fiber 101 was doped with Yb with a doping level of 2 weight %; the doped fiber had a length of 1.0 m; the core diameter was 8 um and the cladding diameter was 125 um. An additional 1.0 m length of undoped polarization-maintaining fiber was also present in the cavity. The overall (summed) dispersion of the two intra-cavity fibers was approximately +0.09 $ps^2$. In contrast, the fiber grating 106 had a dispersion of −0.5 $ps^2$, a spectral bandwidth of 10 nm and a reflectivity of 50%. The grating was manufactured with a phase mask with a chirp rate of 80 nm/cm.

When pumping with an optical power of 1.0 W at a wavelength of 910 nm, the laser produced short chirped optical pulses with a full width half maximum width of 1.5 ps at a repetition rate of 50 MHz. The average output power was as high as 10 mW. The pulse bandwidth was around 2 nm and hence the pulses were more than two times longer than the bandwidth-limit which corresponds to around 800 fs.

Alternatively, a fiber grating 106 with a dispersion of −0.1 $ps^2$, closely matching the dispersion of the intra-cavity fiber, was implemented. The fiber grating had a reflectivity of 9% and a spectral bandwidth of 22 nm centered at 1050 nm. The grating was manufactured with a phase mask with a chirp rate of 320 nm/cm. The laser then produced chirped optical pulses with a full-width half maximum width of 1.0 ps at a repetition rate of 50 MHz with an average power of 25 mW. The pulse spectral bandwidth was around 20 nm and thus the pulses were around 10 times longer than the bandwidth limit, which corresponds to around 100 fs. The generation of pulses with a pulse width corresponding to the bandwidth limit was enabled by the insertion of a pulse compressing element; such elements are well known in the state of the art and are not further discussed here. The generation of even shorter pulses can be generated with fiber gratings with a bandwidth of 40 nm (and more) corresponding to (or exceeding) the spectral gain bandwidth of Yb fibers.

Figure 6:
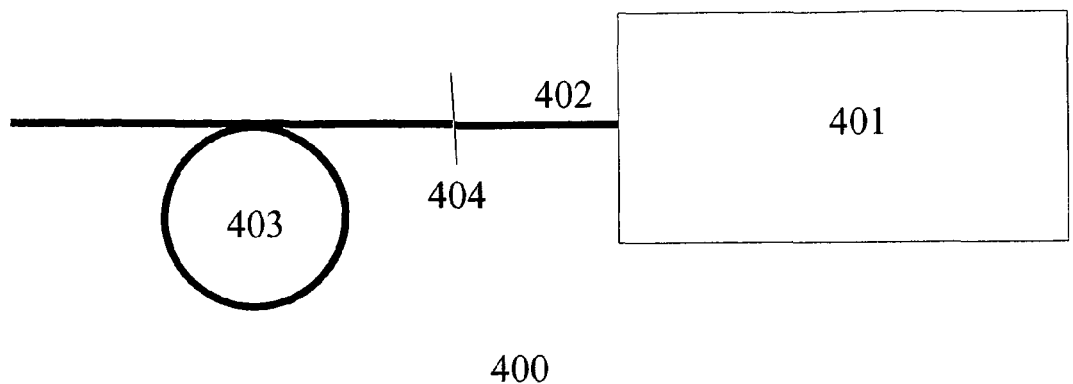
FIG. 6 is a diagram for increasing the optical bandwidth of a fiber laser according to an embodiment of the invention.

Shorter pulses or pulses with a larger bandwidth can be conveniently obtained by coupling the fiber output into another length of nonlinear fiber as shown in FIG. 6. Here, assembly 400 contains the integrated fiber laser 401 with pig-tail 402. Pig-tail 402 is spliced (or connected) to the nonlinear fiber 403 via fiber splice (or connector) 404. Any type of nonlinear fiber can be implemented. Moreover, fiber 403 can also comprise a fiber amplifier to further increase the overall output power.

Figure 7:
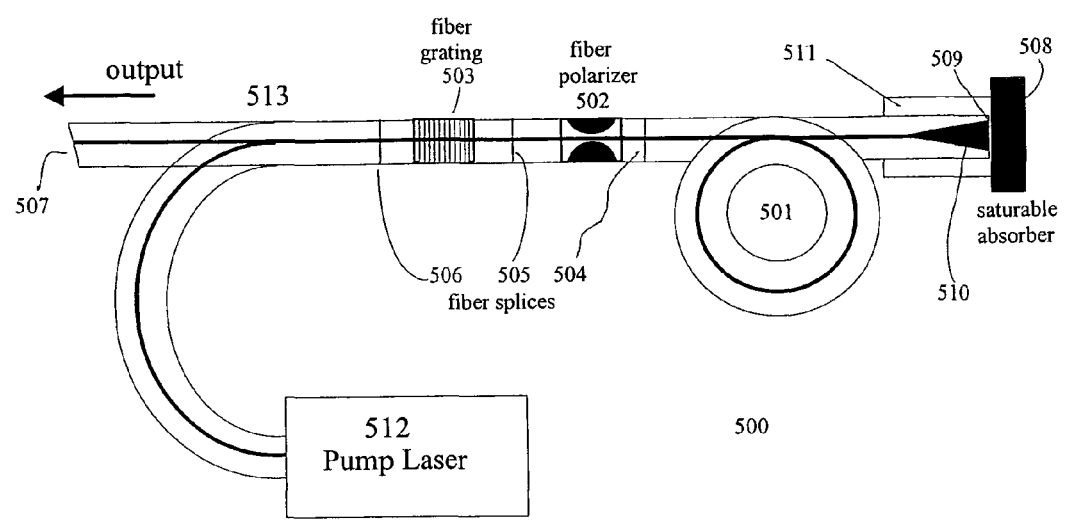
FIG. 7 is a diagram of a core pumped fiber cavity design according to an embodiment of the invention.

In addition to cladding pumped fiber lasers, core-pumped fiber lasers can be constructed in an integrated fashion. Such an assembly is shown in FIG. 7. The construction of cavity 500 is very similar to the cavity shown in FIG. 1. Cavity 500 contains polarization-maintaining fiber 501 and integrated fiber polarizer 502. Fiber 501 is preferably single-clad, though double-clad fiber can also be implemented. The chirped fiber grating 503 again controls the dispersion inside the cavity and is also used as the output coupler. Fiber 501, fiber polarizer 502, fiber grating 503 and the polarization-maintaining output fiber are connected via splices 504–506. The output from the cavity is extracted at angle-cleaved fiber end 507. SAM 508 contains anti-reflection coated fiber end 509, located at the output of the TEC 510. Fiber 501 and SAM 508 are fixed to each other using ferrule 511. The fiber laser is pumped with pump laser 512, which is injected into the fiber via wavelength-division multiplexing coupler 513.

In addition to chirped fiber gratings, unchirped fiber gratings can also be used as output couplers. Such cavity designs are particularly interesting for the construction of compact Er fiber lasers. Cavity designs as discussed with respect to FIGS. 1 and 7 can be implemented and are not separately shown. In the presence of fiber gratings as shown in FIGS. 1 and 7, the fiber gratings can also be used as wavelength tuning elements. In this, the fiber gratings can be heated, compressed or stretched to change their resonance condition, leading to a change in center wavelength of the laser output. Techniques for heating, compressing and stretching the fiber gratings are well known. Accordingly, separate cavity implementations for wavelength tuning via a manipulation of the fiber grating resonance wavelength are not separately shown.

Figure 8:
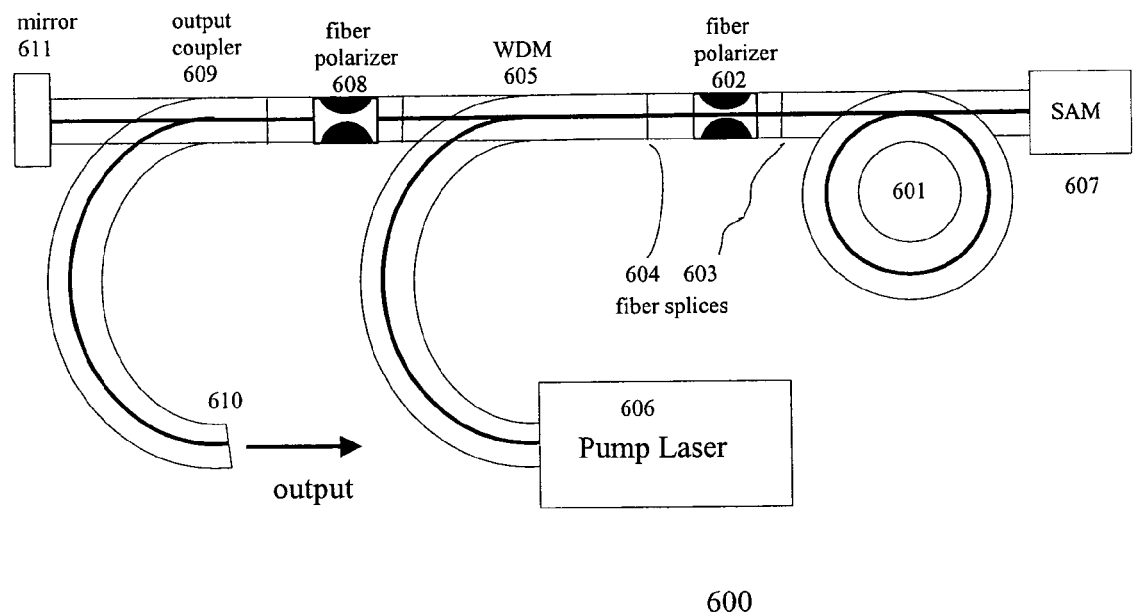
FIG. 8 is a diagram of a core pumped fiber cavity design using intra-cavity wavelength division multiplexers and output couplers according to an embodiment of the invention.

In the absence of a fiber grating, a mirror can be deposited or attached to one end of the fiber cavity. The corresponding cavity design 600 is shown in FIG. 8. Here, it is assumed that the fiber 601 is core pumped. The cavity comprises an intra-cavity all-fiber polarizer 602 spliced to fiber 601 via splice 603. Another splice 604 is used to couple WDM 605 to polarizer 602. Polarization maintaining WDM 605 is connected to pump laser 606, which is used to pump the fiber laser assembly. Saturable absorber mirror assembly 607, as described previously with respect to FIGS. 1 and 7, terminates one cavity end and is also used as the passive modelocking element.

A second fiber polarizer 608 is spliced between WDM 605 and polarization-maintaining output coupler 609 to minimize the formation of satellite pulses, which can occur when splicing sections of polarization maintaining fiber together without perfect alignment of their respective polarization axes, as discussed in U.S. patent application Ser. No. 09/809, 248. Typically, coupler 609 has a coupling ratio of 90/10 to 50/50, i.e., coupler 609 couples about 90–50% of the intra-cavity signal out to fiber pig-tail 610. Pig-tail 610 can be spliced to a fiber isolator or additional fiber amplifiers to increase the pulse power. The second cavity end is terminated by mirror 611. Mirror 611 can be directly coated onto the fiber end face or, alternatively, mirror 611 can be butt-coupled to the adjacent fiber end.

The increase in stability of cavity 600 compared to a cavity where the output coupler fiber, the WDM fiber and gain fiber 601 are directly concatenated without intra-fiber polarizing stages, can be calculated using a Jones matrix formalism even when coherent interaction between the polarization axes of each fiber section occurs.

Briefly, due to the environmental sensitivity of the phase delay between the polarization eigenmodes of each fiber section, for N directly concatenated polarization-maintaining fibers the reflectivity of a fiber Fabry-Perot cavity can vary between $R=1$ and $R=1-(N\times\alpha)^2$, where $\alpha$ is the angular misalignment between each fiber section. Further, it is assumed that $\alpha$ is small (i.e., $\alpha<<10°$) and identical between each pair of fiber sections. Also, any cavity losses are neglected. In fact, it is advantageous to analyze the possible leakage L into the unwanted polarization state at the output of the fiber cavity. L is simply given by $L=1-R$. For the case of N concatenated fiber sections, the maximum leakage is thus $(N\times\alpha)^2$.

In contrast, a cavity containing $N-1$ polarizers in-between N sections of polarization-maintaining fiber is more stable, and the maximum leakage is $L=2\times(N-1)\alpha^2$. Here, any depolarization in the fiber polarizers itself is neglected. For instance, in a case where $N=3$, as in cavity 600, the leakage L into the wrong polarization axis is $2\times(3-1)/3^3=4/9$ times smaller compared to a cavity with three directly concatenated fiber sections. This increase in stability is very important in manufacturing yield as well as in more reproducible modelocked operation in general.

Figure 9:
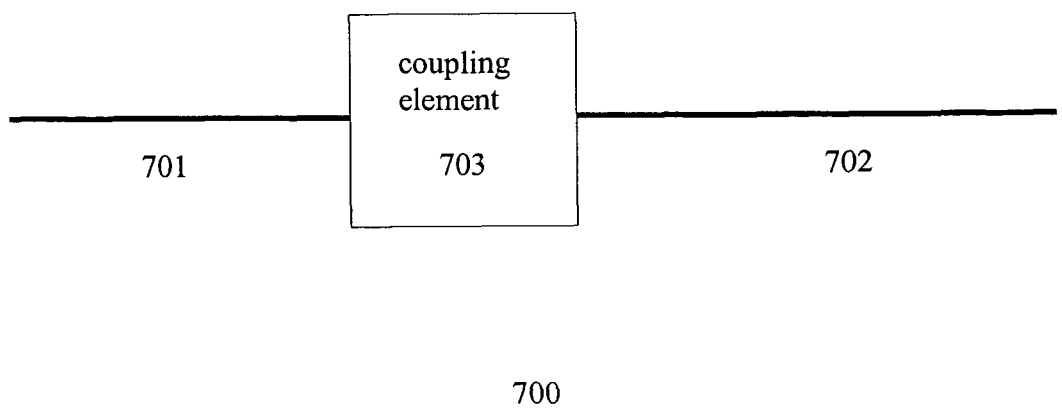
FIG. 9 is a diagram of a core pumped fiber cavity design using intra-cavity wavelength division multiplexers and a butt-coupled fiber pig-tail for output coupling according to an embodiment of the invention.

In constructing a stable laser, it is also important to consider the construction of WDM 605 as well as output coupler 609. Various vendors offer different implementations. An adequate optical representation of such general polarization-maintaining fiber elements is shown in FIG. 9. It is sufficient to assume that a general coupler 700 comprises two polarization-maintaining fiber sections (pig-tails) 701, 702 with a coupling point 703 in the middle, where the two polarization axes of the fiber are approximately aligned with respect to each other.

In order to ensure pulse stability inside a passively modelocked laser, the group-velocity walk-off along the two polarization axes of fiber sections 701, 702 should then be longer than the full-width half maximum (FWHM) pulse width of the pulses generated in the cavity. For example, assuming a birefringent fiber operating at a wavelength of 1550 nm with a birefringence of $3\times10^{-4}$ corresponding to a polarization beat length of 5 mm at 1550 nm, the stable oscillation of soliton pulses with a FWHM width of 300 fs requires pig-tails with a length greater than 29 cm. For 500 fs pulses, the pig-tail length should be increased to around 50 cm.

Referring back to FIG. 8, if a fiber pig-tailed output is not required, mirror 611 as well as output coupler 609 can be omitted, and the 4% reflection from the fiber end adjacent to mirror 611 can be used as an effective output mirror. Such an implementation is not separately shown.

Figure 10:
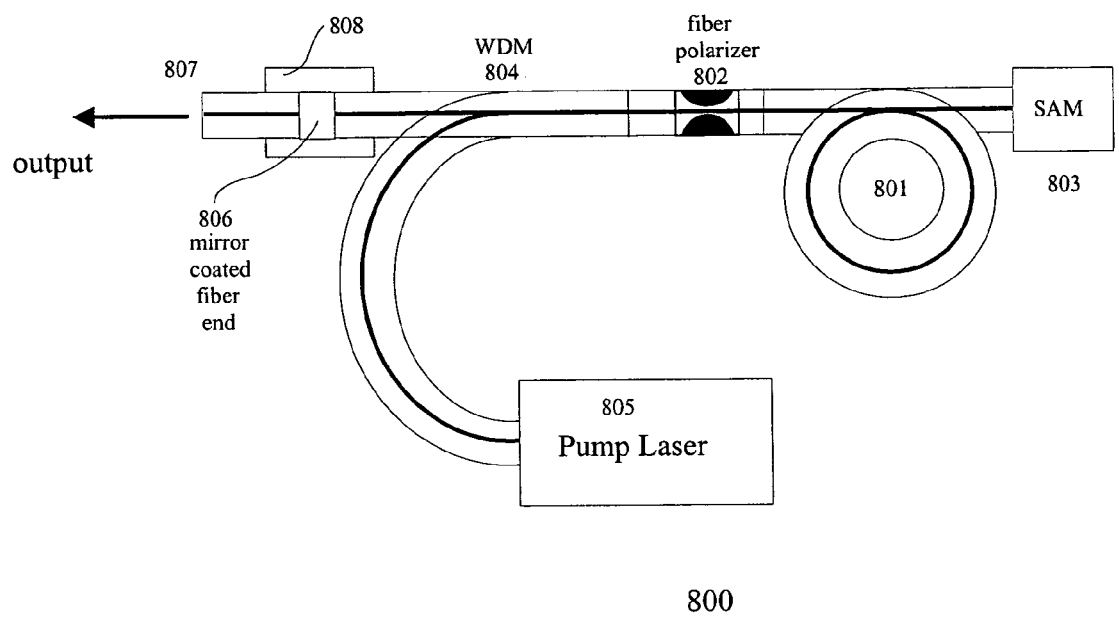
FIG. 10 is a diagram of a cladding pumped fiber cavity design using an intra-cavity output coupler according to an embodiment of the invention.

Alternatively, a fiber-pig-tail can be butt-coupled to mirror 611 and also be used as an output fiber pigtail. Such an implementation is shown in FIG. 10. Here, cavity 800 comprises core-pumped fiber 801, fiber polarizer 802 and SAM assembly 803. The laser is pumped via WDM 804 connected to pump laser 805. An appropriate mirror (or mirror coating) 806 is attached to one end of the cavity to reflect a part of the intra-cavity light back to the cavity and to also serve as an output mirror element. Fiber pig-tail 807 is butt-coupled to the fiber laser output mirror 806 and an additional ferrule 808 can be used to stabilize the whole assembly. The polarization axes of fiber 807 and 801 can be aligned to provide a linearly polarized output polarization. Again, applying a Jones matrix analysis, cavity 800 is more stable than cavity 600, because it comprises only one intra-fiber polarizing section. The maximum leakage in cavity 800 compared to a cavity comprising directly concatenated WDM and gain fiber sections is 50% smaller.

Figure 11:
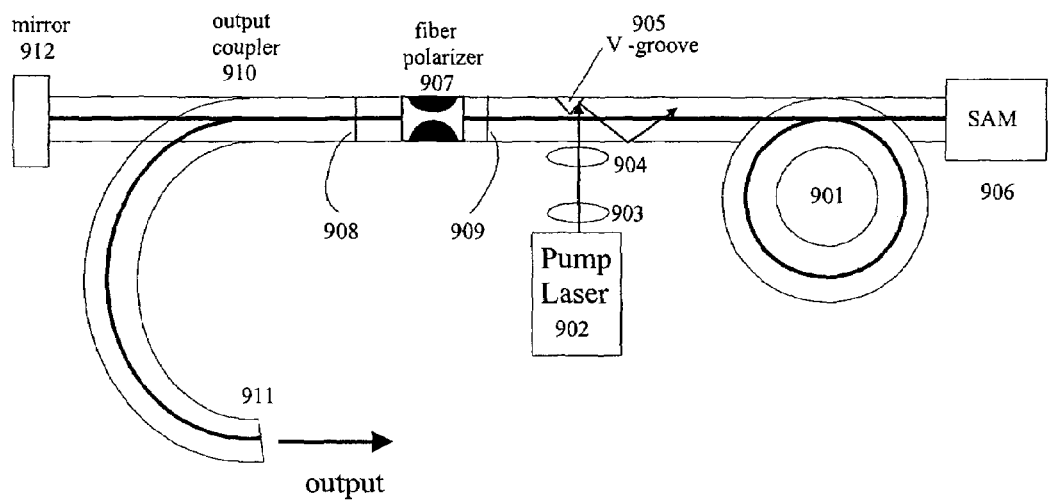
FIG. 11 is a diagram of a cladding pumped fiber cavity design using intra-cavity fiber output couplers according to an embodiment of the invention.

Similarly, a cladding pumped version of cavity 600 can be constructed. Cavity 900 shown in FIG. 11 displays such a cavity design. Fiber 901 is pumped via pump laser 902, which is coupled to fiber 901 via lens assembly 903 and 904 as well as V-groove 905. Alternatively, polarization-maintaining multi-mode fiber couplers or star-couplers could be used for pump power coupling. Such implementations are not separately shown. One end of the laser cavity is terminated with SAM assembly 906 (as discussed in regard to FIGS. 1, 7 and 8), which is also used as the modelocking element. A single-polarization inside the laser is selected via all-fiber polarizer 907, which is spliced into the cavity via splices 908 and 909. Polarization-maintaining output coupler 910 is used for output coupling. The laser output is extracted via fiber end 911, which can further be spliced to additional amplifiers. Cavity mirror 912 terminates the second cavity end. Output coupler 910 can further be omitted and the laser output can be obtained via a butt-coupled fiber pig-tail as explained with reference to FIG. 10.

The cavity designs discussed with respect to FIGS. 1, 7, 8, 10 and 11 follow general design principles as explained with reference to FIGS. 12a–12c.

Figure 12A:
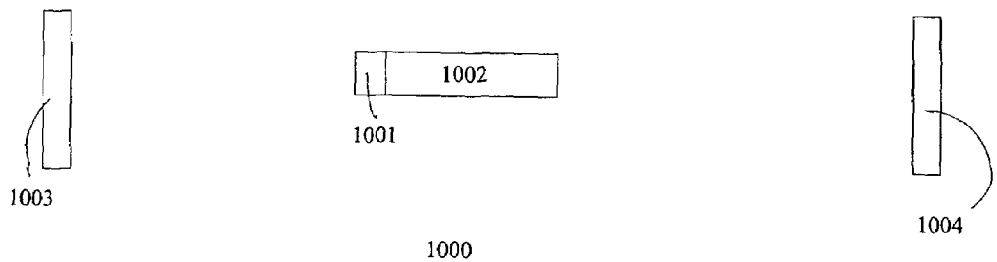
FIG. 12a is a diagram of a passively modelocked fiber laser based on concatenated sections of polarization maintaining and non-polarization maintaining fiber sections according to an embodiment of this invention.

FIG. 12a shows a representative modelocked Fabry-Perot fiber laser cavity 1000, producing a linear polarization state oscillating inside the cavity containing one (or more) sections of non-polarization maintaining fiber 1001 and one (or more) sections of polarization maintaining fiber 1002, where the length of fiber section 1001 is sufficiently short so as not to degrade the linear polarization state inside the fiber laser cavity, more generally a predominantly linear polarization state is oscillating everywhere within the intracavity fiber. The fiber laser output can be obtained from cavity end mirrors 1003 or 1004 on either side of the cavity. To suppress the oscillation of one over the other linear polarization state inside the cavity, either fiber 1001 or 1002 has a polarization dependent loss at the emission wavelength.

Figure 12B:
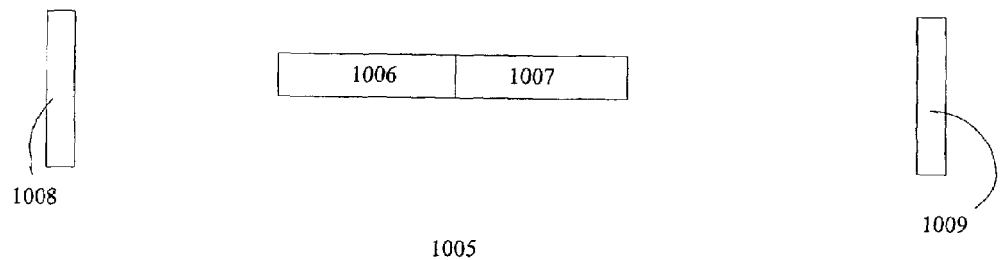
FIG. 12b is a diagram of a passively modelocked fiber laser based on concatenated sections of long polarization maintaining fiber sections according to an embodiment of this invention.

FIG. 12b shows a representative modelocked Fabry-Perot fiber laser cavity 1005, producing a linear polarization state oscillating inside the cavity containing two (or more) sections of polarization maintaining fibers 1006, 1007, where the length of fiber sections 1006, 1007 is sufficiently long so as to prevent coherent interaction of short optical pulses oscillating inside the cavity and propagating along the birefringent axes of fibers 1006, 1007. Specifically, for an oscillating pulse with a FWHM width of $\tau$, the group delay of the oscillating pulses along the two polarization axes of each fiber should be larger than $\tau$. For oscillating chirped pulses $\tau$ represents the bandwidth-limited pulse width that corresponds to the oscillating pulse spectrum. Cavity 1005 also contains end mirrors 1008 and 1009 and can further contain sufficiently short sections of non-polarization maintaining fiber as discussed with reference to FIG. 12a.

Figure 12C:
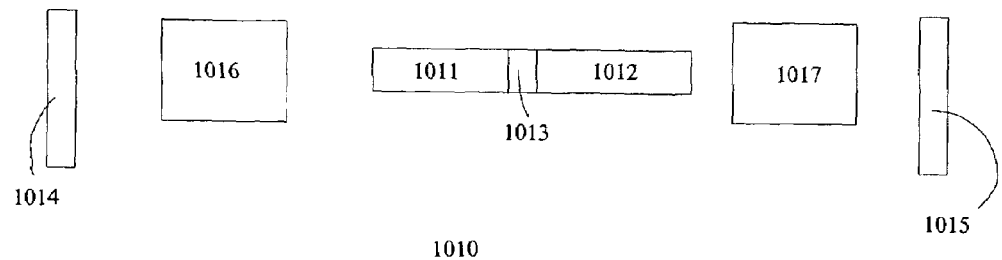
FIG. 12c is a diagram of a passively modelocked fiber laser based on short concatenated sections of polarization maintaining fiber and additional sections of all-fiber polarizer according to an embodiment of this invention.

FIG. 12c shows a representative modelocked Fabry-Perot fiber laser cavity 1010, producing a linear polarization state oscillating inside the cavity containing one (or more) sections of polarization maintaining fiber 1011, 1012 and one (or more) sections of polarizing fiber (or all-fiber polarizer) 1013, where the length of fiber sections 1011, 1013 is not sufficient to prevent coherent interaction of short optical pulses oscillating inside the cavity and propagating along the birefringent axes of fibers 1011, 1013, where the polarizing fiber is sandwiched between the sections of short polarization maintaining fiber. Cavity 1010 further contains cavity end mirror 1014 and 1015 and can further contain short sections of non-polarization maintaining fiber as discussed with reference to FIG. 12a. Moreover, cavity 1010 (as well as 1000 and 1005) can contain bulk optic elements 1016, 1017 (or any larger number) randomly positioned inside the cavity to provide additional pulse control such as wavelength tuning or dispersion compensation. Note that the fibers discussed here can be single-clad, double-clad; the fibers can comprise also holey fibers or multi-mode fibers according to the system requirement. For example polarization maintaining holey fibers can be used for dispersion compensation, whereas multi-mode fibers can be used for maximizing the output pulse energy. Cavity mirrors 1014, 1015, 1003, 1004 and 1008, 1009 can further comprise bulk mirrors, bulk gratings or fiber gratings, where the fiber gratings can be written in short sections of non-polarization maintaining fiber that is short enough so as not to perturb the linear polarization state oscillating inside the cavity.

Figure 13:
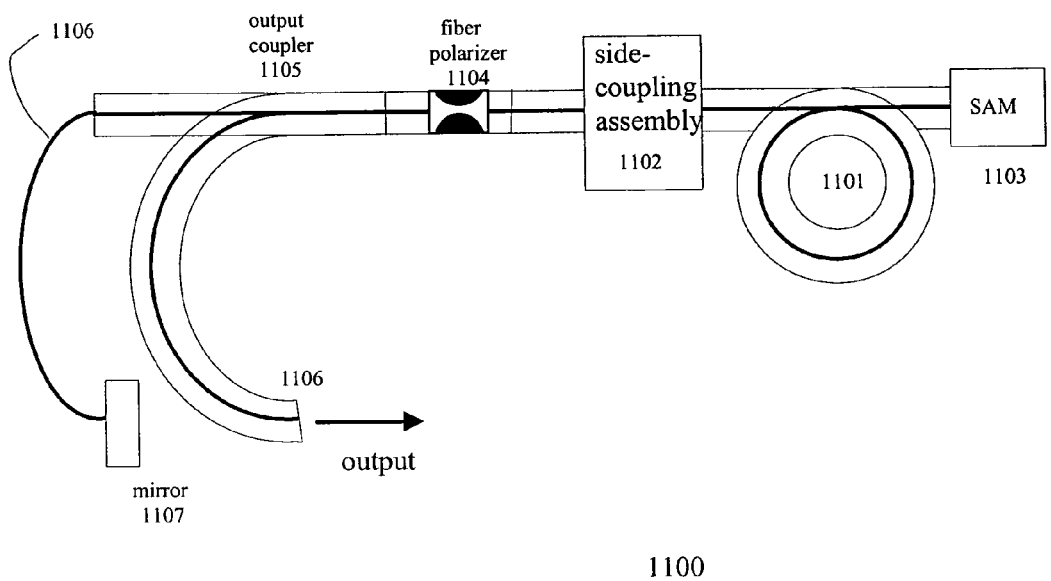
FIG. 13 is a diagram of a dispersion compensated fiber laser cavity according to an embodiment of this invention.

FIG. 13 serves as an example of a passively modelocked linear polarization cavity containing holey fiber for dispersion compensation. Cavity 1100 contains fiber 1101, side-pumping assembly 1102 (directing the pump light either into the cladding or the core of fiber 1101 as explained before), saturable absorber mirror assembly 1103, all fiber polarizer 1104 and fiber output coupler 1105 providing an output at fiber end 1106. All the above components were already discussed with respect to FIG. 8. In addition, a length of polarization maintaining holey fiber 1006 is spliced to the cavity for dispersion compensation and the cavity is terminated on the left hand side by mirror 1107.

Figure 14:
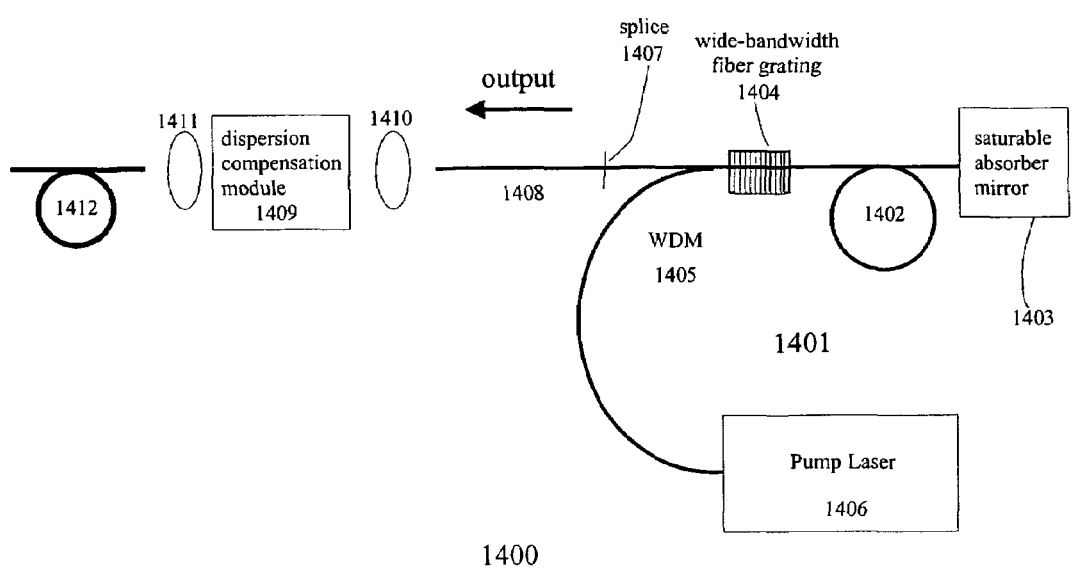
FIG. 14 is a diagram of a dispersion compensated fiber laser cavity according to an alternative embodiment of this invention, including means for additional spectral broadening of the fiber laser output.

FIG. 14 serves as another example of a passively modelocked linear polarization cavity containing a fiber grating for dispersion compensation as applied to the generation of ultra-stable spectral continua. System 1400 comprises a small modification of the cavity explained with respect to FIG. 7. System 1400 contains a fiber laser 1401 generating pulses with a bandwidth comparable to the spectral bandwidth of the fiber gain medium 1402. Fiber laser 1401 further comprises saturable absorber mirror assembly 1403, wide bandwidth fiber grating 1404, polarization maintaining wavelength division multiplexing (WDM) coupler 1405, which is used to direct pump laser 1406 into fiber gain medium 1402. Pump laser 1406 is preferably single-mode to generate the least amount of noise.

To enable the oscillation of short pulses with a bandwidth comparable to the bandwidth of the gain medium 1402, saturable absorber mirror 1403 contains a bi-temporal saturable absorber, constructed with a bi-temporal life-time comprising a $1^{st}$ short life-time of <5 ps and a $2^{nd}$ long life-time of >50 ps. More preferable is a first life-time of <1 ps, to allow pulse shaping of pulses as short as 100 fs and shorter. By selecting the penetration depth of the implanted ions into the saturable absorber, even tri-temporal saturable absorbers can be constructed.

The wide-bandwidth grating is preferably selected to approximately match the dispersion of the intra-cavity fibers. The wide-bandwidth grating can be made in short non-polarization maintaining fibers and it can be made also in polarization maintaining fibers. In order to suppress detrimental effects from cross coupling between the two polarization axes of the fiber grating, coupling to cladding modes in such large bandwidth fiber gratings should be suppressed. Gratings with suppressed coupling to cladding modes can be made in optical fibers with photosensitive core and cladding area, where the photosensitive cladding area is index-matched to the rest of the cladding. Such fiber designs are well known in the state of the art and can for example be manufactured with an appropriate selection of germania and fluorine doping in the core and cladding regions and such fiber designs are not further discussed here. Because of the large generated bandwidth, splicing of such polarization maintaining gratings to the rest of the cavity without coherent coupling between the linear polarization eigenmodes is no problem. Alternatively, the fiber gratings can be written directly into the photosensitive gain fiber, with an index and dopant profile that suppresses coupling to cladding modes in the fiber grating.

To sustain large spectral bandwidth, fiber grating 1404 has preferably a spectral bandwidth >20 nm. A splice 1407 (or an equivalent bulk optic lens assembly) is used to connect the output of fiber laser 1401 to nonlinear fiber 1408 to be used for additional spectral broadening of the output of the fiber laser. For example fiber 1408 can comprise a highly nonlinear dispersion-flattened holy fiber. In conjunction with such fiber, smooth broad-bandwidth spectral profiles with bandwidths exceeding 100 nm can be generated. These spectral outputs can be used directly in high precision optical coherence tomography.

The pulses at the output of fiber 1408 are generally chirped and a dispersion compensation module 1409 can be inserted after the output from fiber 1408 for additional pulse compression. The dispersion compensation module can be spliced directly to fiber end 1408 when optical fiber is used for dispersion compensation. Alternatively, the dispersion compensation module can comprise two (or one) bulk grating (or prism) pair(s). Such bulk optic elements for dispersion compensation are well known in the state of the art and are not further discussed here. Coupling into and out of a bulk dispersion compensating module is obtained via lenses 1410 and 1411. The pulses generated after pulse compression can be as short as 20–200 fs.

An additional highly nonlinear fiber 1412 (or a number of spliced together highly nonlinear fibers) is then used for the generation of the coherent spectral continuum. These spectral continua can be subsequently used in precision frequency metrology.

Note that the discussion with respect to FIG. 14 serves only as an example of the use of bi- or multi-temporal saturable absorbers in the generation of mass producible ultra-broad band, low noise spectral sources. Other modifications are obvious to anyone skilled in the art. These modifications can comprise for example the insertion of additional fiber amplifiers after the output of fiber laser 1401 and the construction of an integrated all-fiber assembly substituting elements 1408, 1409–1411 and 1412.

Though the discussion of the laser system with respect to FIG. 14 was based on the use of polarization maintaining fiber, non polarization maintaining fiber can also be used to produce pulses with bandwidth comparable to the bandwidth of the gain medium. In this case, saturable absorbers with depth controlled ion implantation are also of great value. Essentially, any of the prior art modelocked fiber laser systems described above (that were using saturable absorbers) can be improved with engineered bi- and multi-temporal saturable absorbers. Specifically, any of the cavity designs described in '427 and '848 to Fermann et al. can be used for the generation of ultra broadband optical pulses in conjunction with bi-or multi-temporal saturable absorbers and wide-bandwidth fiber Bragg gratings.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims and equivalents thereof.

What is claimed is:

1. A saturable absorber mirror for passive modelocking of lasers, comprising:
a film of a semiconductor material implanted with high energy ions at a penetration depth which differs from the penetration depth of optical signals reflected from said saturable absorber mirror, said semiconductor material having an ion implantation depth profile selected to provide saturable absorption having a multi-temporal carrier relaxation.

2. A saturable absorber mirror as defined in claim 1, wherein the thickness of said film is selected to be in the range of 50 nm–2000 nm.

3. A saturable absorber mirror as defined in claim 1, wherein said high energy ions comprise protons, arsenic or beryllium.

4. A saturable absorber mirror as defined in claim 1, wherein the implantation dosage of said high energy ions is in a range of $10^{12}$–$10^{17}$ ions/cm$^2$.

5. A saturable absorber mirror as defined in 1, wherein said high energy ions comprise protons and wherein the implantation energy of said high energy ions is in the range of 5 keV–200 keV.

6. A saturable absorber mirror as defined in claim 1, wherein said high energy ions comprise arsenic, and wherein the implantation energy is in the range of 100 keV–1000 keV.

7. A saturable absorber mirror as defined in claim 1, where one surface of said mirror is anti-reflection-coated.

8. A saturable absorber mirror for passive modelocking of lasers, comprising:
a film of a semiconductor material implanted with high energy ions at a penetration depth which differs from the penetration depth of optical signals reflected from said saturable absorber mirror, said film exhibiting multi-temporal relaxation,
wherein the thickness of said film controls the phase of the reflected light signal within opposite surfaces of said mirror.

9. A saturable absorber mirror for passive modelocking of lasers, comprising:
a film of a semiconductor material implanted with high energy ions at a penetration depth which differs from the penetration depth of optical signals reflected from said saturable absorber mirror,
wherein said semiconductor material exhibits multi-temporal relaxation under optical excitation with short optical pulses.

10. A saturable absorber mirror as defined in claim 9, wherein a first relaxation time in said semiconductor film is less than 10 ps and a second relaxation time in said semiconductor film is greater than 100 ps.

11. A saturable absorber mirror as defined in claim 1, wherein said semiconductor film comprises a bulk semiconductor.

12. A saturable absorber mirror as defined in claim 1, wherein said semiconductor film comprises a multiple quantum well structure.

13. A saturable absorber mirror as defined in claim 1, wherein said semiconductor film comprises a combination of a bulk semiconductor and a multiple quantum well structure.

14. A saturable absorber mirror for passive modelocking of lasers, comprising:
a film of a semiconductor material implanted with high energy ions at a penetration depth which is smaller than the penetration depth of optical signals reflected from said saturable absorber mirror, said high energy ions creating a first trap concentration at a first depth region and a second trap concentration at a second depth region such that said film exhibits saturable absorption governed by a fast time constant and a slow time constant.

15. A saturable absorber to be operated in transmission for passive modelocking of lasers, comprising:
a film of a semiconductor material implanted with high energy ions at a penetration depth which is smaller than the thickness of said film such that said film exhibits multi-temporal relaxation.

16. A saturable absorber for passive modelocking of lasers operating in the 1.0–1.1 um wavelength range, comprising:
a film of bulk InGaAsP or quantum wells fabricated with a bandgap in the 1.0–1.1 um wavelength region, said film implanted with high energy ions at a penetration depth which differs from the penetration depth of optical signals, and said film exhibit multi-temporal relaxation.

17. A saturable absorber mirror as defined in claim 1, wherein said ion depth profile is selected to provide saturable absorption having a bi-temporal carrier relaxation.

18. A saturable absorber mirror as defined in claim 1, wherein said semiconductor material comprises GaAs related materials or InP related materials.

19. A saturable absorber mirror as defined in claim 1, wherein said saturable absorber mirror is electrodeless.

20. A saturable absorber mirror as defined in claim 1, wherein said film exhibits a depth-dependent ion concentration profile having a peak value and a minimal value.

21. A saturable absorber mirror as defined in claim 20, wherein the depth corresponding to said minimal value is at said penetration depth of optical signals.

22. A saturable absorber mirror as defined in claim 1, further comprising a heat sink disposed with respect to said film to sink heat therefrom.

23. A saturable absorber mirror as defined in claim 8, wherein said semiconductor material comprises GaAs related materials or InP related materials.

24. A saturable absorber mirror as defined in claim 9, wherein said semiconductor material comprises GaAs related materials or InP related materials.

25. A saturable absorber mirror as defined in claim 14, wherein said semiconductor material comprises GaAs related materials or InP related materials.

26. A saturable absorber mirror as defined in claim 14, wherein said film exhibits bi-temporal carrier relaxation.

27. A saturable absorber mirror as defined in claim 14, wherein said saturable absorber mirror is electrodeless.

28. A saturable absorber mirror as defined in claim 14, wherein said film is anti-reflection-coated.

29. A saturable absorber mirror as defined in claim 14, wherein said fast time constant is less than 20 ps and said slow time constant is greater than 100 ps.

30. A saturable absorber mirror as defined in claim 14, wherein said fast time constant is less than 10 ps and said slow time constant is greater than 100 ps.

31. A saturable absorber mirror as defined in claim 14, wherein said fast time constant is less than 1 ps and said slow time constant is greater than 100 ps.

32. A saturable absorber mirror as defined in claim 14, wherein said first trap concentration at said first depth region is a peak value and said second trap concentration at said second depth region is a minimal value.

33. A saturable absorber mirror as defined in claim 32, wherein said peak value controls said fast time constant.

34. A saturable absorber mirror as defined in claim 32, wherein said minimal value controls said slow time constant.

35. A saturable absorber mirror as defined in claim 14, wherein said film is attached to a heat sink.

36. A saturable absorber mirror as defined in claim 35, wherein said heat sink comprises metal, diamond or sapphire.

37. A saturable absorber mirror as defined in claim 35, wherein said heat sink comprises a metallic mirror.

38. A saturable absorber as defined in claim 15, wherein said film exhibits bi-temporal relaxation.

39. A saturable absorber as defined in claim 15, wherein said semiconductor material comprises GaAs related materials or InP related materials.

40. A saturable absorber as defined in claim 15, wherein said material is aluminum-free.

41. A saturable absorber as defined in claim 40, wherein said aluminum-free material comprises InGaAsP material.

42. A saturable absorber as defined in claim 15, wherein said material has a wavelength bandedge of approximately 1 micrometer.

43. A saturable absorber as defined in claim 15, wherein said material has a wavelength bandedge between 1.0 and 1.6 micrometers.

44. A saturable absorber as defined in claim 15, where one surface of said film is anti-reflection-coated.

45. A saturable absorber as defined in claim 15, wherein said saturable absorber is electrodeless.

46. A saturable absorber as defined in claim 16, wherein said film exhibits bi-temporal relaxation.

47. A saturable absorber as defined in claim 16, wherein a first relaxation time in said film is less than 10 ps and a second relaxation time in said film is greater than 100 ps.

48. A saturable absorber as defined in claim 16, wherein said film is anti-reflection-coated.

49. A saturable absorber as defined in claim 16, wherein said saturable absorber is electrodeless.

50. A saturable absorber as defined in claim 16, further comprising a heat sink.

51. A saturable absorber as defined in claim 16, further comprising a dielectric mirror.

52. A saturable absorber as defined in claim 16, further comprising a reflector comprising gold or silver.

53. A method of producing optical pulses, said method comprising directing light into a saturable absorber comprising a semiconductor material implanted with high energy ions at a penetration depth which is smaller than the penetration depth of said light directed into said saturable absorber, said high energy ions having a depth profile such said saturable absorber exhibits multi-temporal carrier relaxation.

54. A method of producing optical pulses as defined in claim 53, wherein said ion depth profile is such that said saturable absorber exhibits bi-temporal carrier relaxation.

55. A method of producing optical pulses as defined in claim 53, wherein said ion depth profile is such that said saturable absorber exhibits a first relaxation time less than 10 ps and a second relaxation time greater than 100 ps.

56. A method of producing optical pulses as defined in claim 53, wherein said saturable absorber is electrodeless.

57. A method of producing optical pulses as defined in claim 53, wherein said semiconductor material comprises GaAs related materials or InP related materials.

58. A method of manufacturing a saturable absorber, said method comprising implanting a semiconductor material with high energy ions at a penetration depth which is smaller than the thickness of said semiconductor material thereby creating a first trap concentration at a first depth region and a second trap concentration at a second depth region such that said semiconductor material exhibits saturable absorption governed by a first predetermined fast time constant and a second predetermined slow time constant.

59. A method of manufacturing a saturable absorber as in claim 58, said method further comprising implanting the semiconductor material such that said first predetermined fast time constant is less than 10 ps and said second predetermined slow time constant is greater than 100 ps.

60. A method of manufacturing a saturable absorber as in claim 58, wherein said step of implanting a semiconductor material with high energy ions further comprises providing an ion implantation depth profile selected to provide saturable absorption having a bi-temporal carrier relaxation.

61. A method of manufacturing a saturable absorber as in claim 58, said method further comprising providing a saturable absorber that is electrodeless.

62. A method of manufacturing a saturable absorber as in claim 58, said method further comprising providing said semiconductor material that comprises GaAs related materials or InP related materials.

* * * * *

UNITED STATES PATENT AND TRADEMARK OFFICE
CERTIFICATE OF CORRECTION

PATENT NO. : 7,088,756 B2  Page 1 of 1
APPLICATION NO. : 10/627069
DATED : August 8, 2006
INVENTOR(S) : Martin E. Fermann and Gyu C. Cho It is certified that error appears in the above-identified patent and that said Letters Patent is hereby corrected as shown below:

Column 8, line 65, delete "AlGaInAs/InP" and insert -- AlGaInAs --, therefor.
Column 18, line 19, In Claim 16, delete "exhibit" and insert -- exhibits --, therefor.

Signed and Sealed this

Thirteenth Day of March, 2007

JON W. DUDAS
*Director of the United States Patent and Trademark Office*